United States Patent
Kim

(10) Patent No.: US 10,001,426 B2
(45) Date of Patent: Jun. 19, 2018

(54) APPARATUS FOR TESTING WATER RESISTANCE OF MOBILE TERMINAL USING REFERENCE CHAMBER UNIT

(71) Applicant: Dong Un Kim, Incheon (KR)

(72) Inventor: Dong Un Kim, Incheon (KR)

(73) Assignee: Dong Un Kim, Incheon (KR)

( * ) Notice: Subject to any disclaimer, the term of this patent is extended or adjusted under 35 U.S.C. 154(b) by 178 days.

(21) Appl. No.: 15/263,814

(22) Filed: Sep. 13, 2016

(65) Prior Publication Data

US 2018/0073954 A1    Mar. 15, 2018

(51) Int. Cl.
| G01M 3/04 | (2006.01) |
| G01M 3/02 | (2006.01) |
| G01L 13/00 | (2006.01) |
| H04B 17/00 | (2015.01) |

(52) U.S. Cl.
CPC ............ G01M 3/02 (2013.01); G01L 13/00 (2013.01); H04B 17/00 (2013.01)

(58) Field of Classification Search
USPC .................................................. 73/40, 45.5
See application file for complete search history.

(56) References Cited

U.S. PATENT DOCUMENTS

| 3,326,034 | A | * | 6/1967 | Moore, Jr. | ........... G01M 3/3263 73/40 |
| 3,538,758 | A | * | 11/1970 | Karper | ................. G01N 11/165 374/53 |
| 2014/0260550 | A1 | * | 9/2014 | Kil | ....................... G01M 3/3272 73/40 |
| 2015/0261260 | A1 | * | 9/2015 | Nicholas | ................ H05K 5/064 361/679.01 |

FOREIGN PATENT DOCUMENTS

| KR | 200274081 | 5/2002 |
| KR | 1020060092866 | 8/2006 |
| KR | 100922587 | 10/2009 |
| KR | 101406698 | 6/2014 |

* cited by examiner

*Primary Examiner* — Clayton E Laballe
*Assistant Examiner* — Warren K Fenwick
(74) *Attorney, Agent, or Firm* — Cantor Colburn LLP

(57) ABSTRACT

Provided is an apparatus for testing the water resistance of a mobile terminal, by which whether a mobile terminal is water-resistant is checked. Specifically, the apparatus uses a reference chamber unit in order to check the effect of external environmental factors, such as temperature, humidity and the like, in different places and times, in advance, and incorporates the effect of external environmental factors in a mobile terminal water resistance test in a test chamber unit, whereby a more precise test may be performed. The apparatus for testing the water resistance of a mobile terminal using a reference chamber unit is configured to include an air-supply means, a pressure regulator chamber unit, a test chamber unit, a reference chamber unit, a pressure-measuring instrument, and a controller.

4 Claims, 3 Drawing Sheets

APPARATUS FOR TESTING WATER RESISTANCE OF MOBILE TERMINAL USING REFERENCE CHAMBER UNIT

BACKGROUND OF THE INVENTION

Field of the Invention

The present invention generally relates to an apparatus for testing the water resistance of a mobile terminal, by which whether or not the mobile terminal is water-resistant is checked. More particularly, the present invention relates to an apparatus for testing the water resistance of a mobile terminal using a reference chamber unit, which is configured such that the effects of external environmental factors, such as temperature, humidity and the like, which change in difference times and places, are checked in advance using a reference chamber unit in order to incorporate the effects of external environmental factors in a mobile terminal water resistance test performed in a test chamber unit, the water resistance test is performed after air is removed from a defective water-resistant phone by causing a suction unit to suck the air from the test chamber unit in which the mobile phone is contained, and a buffer tank is employed in an air-supply means so as to stabilize high-pressure air to be injected into a compressor, whereby a more precise and accurate water resistance test may be performed.

Description of the Related Art

Recently, with the development of IT technology, various kinds of mobile terminals, such as a mobile phone, a PDA, an MP3 player and the like, have been developed.

Because a mobile terminal is carried while moving, it may come into contact with water anytime. Also, because a mobile terminal contains electronic components that are vulnerable to water therein, the water resistance is a main factor that affects the quality of the mobile terminal.

A general method for testing the water resistance of a mobile terminal is performed by immersing the mobile terminal in water for a certain time, disassembling the mobile terminal after removing it from water, and observing the path and volume of the water permeating the mobile terminal.

However, this method is disadvantageous in that a mobile terminal may be damaged if the water resistance thereof is not guaranteed. That is, in the case of a mobile terminal, the water resistance of which is not guaranteed, when the mobile terminal is immersed in water in order to test the water resistance thereof, because the water may permeate the mobile terminal and damage electronic components therein, the expensive mobile terminal may need to be discarded as the result of the water resistance test.

Also, because it is necessary to immerse a mobile terminal for a certain time, and because considerable time is spent to disassemble, observe, and reassemble the mobile terminal, the water resistance test is time-consuming.

Also, because the water resistance is checked in such a way that a tester observes the path of water permeating a mobile terminal, it is difficult to guarantee the accuracy of the test.

Furthermore, when a mobile terminal, the water resistance of which is guaranteed, is reassembled after being disassembled, the reassembly thereof may compromise water resistance.

In order to solve the above problems that may lead to damaging a mobile terminal during a water resistance test, Korean Patent No. 10-0922587, titled "Leakage testing apparatus for airtight container", Korean utility model No. 20-0274081, titled "Apparatus inspecting waterproof of a mobile phone", Korean Patent Application Publication No. 10-2006-0092866, titled "Method and system for detecting leak in electronic devices", and the like are disclosed as a conventional art.

However, the conventional methods are problematic in that the water resistance tests are time-consuming and unreliable.

Accordingly, the present applicant proposed Korean Patent Application Publication No. 10-2013-0096339, titled "Apparatus for testing water resistance of mobile terminal using two chambers", illustrated in FIG. 1, in 2013.

The apparatus for testing the water resistance of a mobile terminal in FIG. 1, proposed by the present applicant, includes an air-supply means 10, a pressure regulator chamber unit 20 that is filled with air supplied from the air-supply means 10 at a constant pressure, a test chamber unit 30 in which the mobile terminal is contained and to which the air in the pressure regulator chamber unit flows, a switch 40 for opening or closing a flow path that connects the pressure regulator chamber unit and the test chamber unit, and a pressure-measuring instrument 50 for measuring the pressure in the test chamber unit or in the pressure regulator chamber unit, whereby the water resistance of a mobile terminal may be tested more quickly or accurately than when using a conventional apparatus for testing the water resistance of a mobile terminal.

However, the apparatus for testing the water resistance of a mobile terminal in FIG. 1, proposed by the present applicant, ignores the effects of external environmental factors, such as temperature, humidity and the like. Accordingly, when a leak in a terminal, which causes a problem of water resistance, is small, or when the volume of the internal space connected to the outside through the leak is small, the water resistance may be erroneously determined.

In other words, according to Boyle-Charles's Law, the pressure of air is affected by external environmental factors, such as temperature, humidity and the like. Therefore, when the effects of external environmental factors, such as temperature, humidity and the like, which vary depending on the time and place at which the water resistance test is performed, are incorporated in the test, a more precise test may be performed. However, the apparatus for testing the water resistance of a mobile terminal in FIG. 1 does not include the effects of external environmental factors in the test.

Also, in the case of the apparatus for testing the water resistance of a mobile terminal in FIG. 1, when the volume of the internal space of a mobile terminal, connected to the outside through a leak, is small, only a small amount of high-pressure air may permeate the mobile terminal through the leak during the test, whereby it may be erroneously determined that the mobile terminal has satisfactory water resistance even though it actually has insufficient water resistance.

Also, because the pressure of air emitted from an air compressor is not maintained constant and the temperature of the emitted air varies depending on the position at which the air compressor is installed, the state of a pipe, and the like, that is, because the high-pressure air is emitted from the air compressor under unstable conditions, the apparatus for testing the water resistance of a mobile terminal is required to stabilize the high-pressure air emitted from the air compressor. However, the apparatus for testing the water resistance of a mobile terminal in FIG. 1 does not include any means for stabilizing the unstable high-pressure air emitted from the air compressor.

The foregoing is intended merely to aid in the understanding of the background of the present invention, and is not intended to mean that the present invention falls within the purview of the related art that is already known to those skilled in the art.

SUMMARY OF THE INVENTION

The present invention relates to an apparatus for testing the water resistance of a mobile terminal, which improves the apparatus for testing the water resistance of a mobile terminal using two chambers, as disclosed in Korean Patent Application Publication No. 10-2013-0096339, which was proposed by the present applicant.

An object of the present invention is to provide an apparatus for testing the water resistance of a mobile terminal using a reference chamber unit, which is configured such that the effects of external environmental factors, such as temperature, humidity and the like, on a change in pressure are checked using a reference chamber unit before a water resistance test is performed in a test chamber unit, and the checked result is incorporated in the water resistance test in the test chamber unit, whereby a more precise test may be performed.

Also, another object of the present invention is to provide an apparatus for testing the water resistance of a mobile terminal using a reference chamber unit, which is configured such that a suction unit sucks air from a test chamber unit containing a mobile terminal in order to remove air from the mobile terminal having deficient water resistance, after which high-pressure air is blown into the test chamber unit, whereby a change in the pressure in the test chamber unit may be increased, and thus a more precise water resistance test may be performed.

A further object of the present invention is to provide an apparatus for testing the water resistance of a mobile terminal using a reference chamber unit, in which unstable high-pressure air emitted from an air compressor is stabilized in a buffer tank and is then supplied to a pressure regulator chamber unit, whereby a more precise water resistance test may be performed.

In order to achieve the above object, an apparatus for testing a water resistance of a mobile terminal using a reference chamber unit according to the present invention includes an air-supply means; a pressure regulator chamber unit that is filled with air, supplied from the air-supply means, at a constant pressure; a test chamber unit for testing the water resistance of the mobile terminal, contained therein, by receiving the air, which fills the pressure regulator chamber unit; a reference chamber unit for incorporating external environmental factors in a mobile terminal water resistance test by receiving the air that fills the pressure regulator chamber unit and checking, in advance, a change in a pressure in reference space therein using an identical method as the test chamber unit; and a controller for controlling operation of the air-supply means and determining whether or not the mobile terminal is water-resistant using a pressure value transmitted from a pressure-measuring instrument arranged in the pressure regulator chamber unit or in the test chamber unit and using a pressure value transmitted from a pressure-measuring instrument in the reference chamber unit, wherein the controller comprises a signal-generation module that includes a noise amplifier unit for amplifying DC signal power, a noise detector unit for detecting noise included in the amplified signal power, a filter unit for removing the detected noise, a filter operation unit for operating the filter unit only when the noise is detected, a signal generator unit for generating a control signal from the signal power from which the noise is removed, and a signal output unit for checking whether the generated control signal is clean and outputting the control signal.

The apparatus may further include a suction unit for sucking air from the test chamber unit that contains the mobile terminal therein, and the test chamber unit may include a pipe for connecting a container therein to an outside in order to make a pressure in the container reach atmospheric pressure and an opening and closing member for opening or closing the pipe.

The air-supply means may include a compressor for supplying high-pressure air, a buffer tank in which the high-pressure air, injected from the compressor, is stored for a certain time and thereby is stabilized, and a regulator for supplying the air stored in the buffer tank to the pressure regulator chamber unit at a constant pressure.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
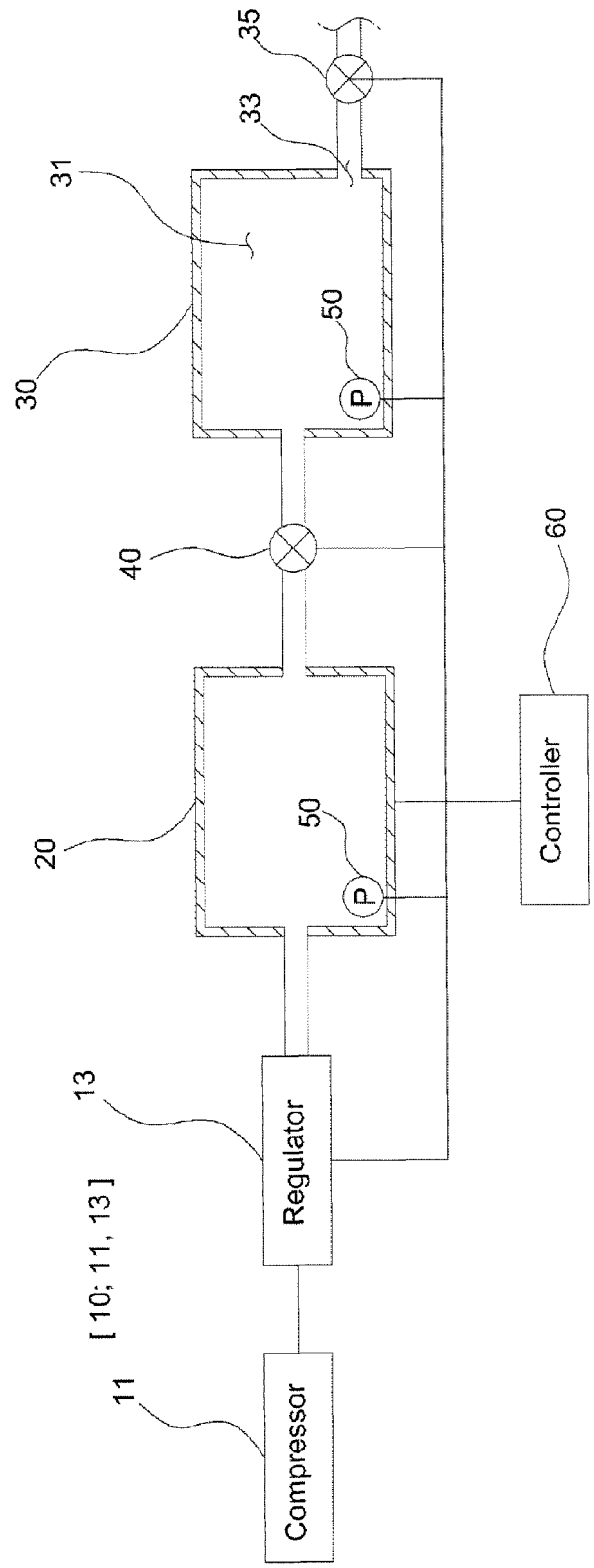
FIG. 1 is a schematic block diagram of an apparatus for testing the water resistance of a mobile terminal using two chambers disclosed in Korean Patent Application Publication No. 10-2013-0096339 proposed by the present applicant.

Hereinafter, an apparatus for testing the water resistance of a mobile terminal using a reference chamber unit according to the present invention will be described in detail with reference to the accompanying drawings.

The present invention will now be described in detail based on aspects (or embodiments). The present invention may, however, be embodied in many different forms and should not be construed as being limited only to the embodiments set forth herein, but should be construed as covering modifications, equivalents or alternatives falling within the ideas and technical scope of the present invention.

Wherever possible, the same reference numerals, in particular, the reference numerals in which a two-digit number and one-digit number are the same or a two-digit number, one-digit number and letters of the alphabet are the same, will be used throughout the drawings and the description to refer to the same or like members. Unless otherwise stated, the members designated by respective reference numerals in the drawings are regarded as members based on such standards.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that the terms used herein should be interpreted as having a meaning that is consistent with their meaning in the context of this specification and the relevant art and will not be interpreted in an idealized or overly formal sense unless expressly so defined herein.

Figure 2:
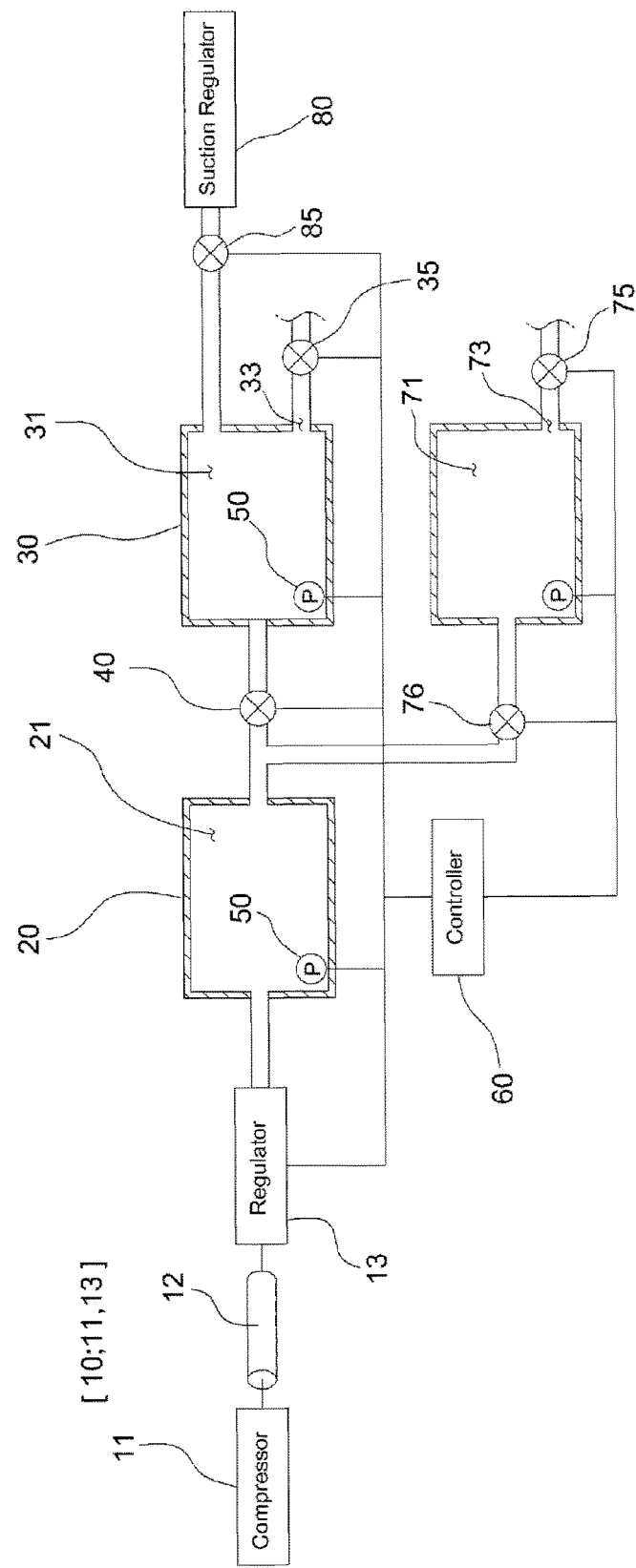
FIG. 2 is a block diagram of an apparatus for testing the water resistance of a mobile terminal using a reference chamber unit according to the present invention, which improves the apparatus of FIG. 1.

As shown in FIG. 2, an apparatus for testing the water resistance of a mobile terminal using a reference chamber unit according to the present invention includes an air-supply means 10, a pressure regulator chamber unit 20, a test chamber unit 30, a switch 40, a pressure-measuring instrument 50 and a controller 60, like the apparatus in FIG. 1, and further includes a reference chamber unit 70, a suction unit 80, a buffer tank 12 and the like.

The air-supply means 10 supplies high-pressure compressed air to the pressure regulator chamber unit 20.

The air-supply means 10 includes a compressor 11 for emitting compressed air stored therein and a regulator 13 for emitting the compressed air, emitted from the compressor 11, so as to be supplied to the pressure regulator chamber unit 20 at a constant pressure, that is, for regulating the pressure of the air (that is, the amount of air) with which the pressure regulator chamber unit 20 is to be filled.

Also, the buffer tank 12 is arranged between the compressor 11 and the regulator 13.

The buffer tank 12 stores the high-pressure air emitted from the compressor 11 for a certain time, whereby the high-pressure air is stabilized.

The pressure of the air emitted from the compressor 11 is not maintained constant but decreases upon the emission of air, and the temperature of the emitted air varies depending on the position at which the compressor is installed and the state of the pipe through which the air is emitted; that is, the air emitted from the compressor is in an unstable condition.

In order to reduce the pulsation of air emitted from the compressor, the buffer tank 12 contains filler with which the flowing high-pressure air collides, whereby the flow of air is somewhat disrupted. While the air passes through the filler and stays in the buffer tank 12, the temperature of the air comes close to the temperature for measurement, and then the air is supplied to the regulator 13. That is, the air flowing in the buffer tank 12 is unstable because it has strong flow and the variation in temperature and pressure is large, but the air emitted from the buffer tank is stable because it has weak flow and decreased variation in temperature and pressure.

The pressure regulator chamber unit 20 is filled with high-pressure air by being supplied with the air from the air-supply means 10 and supplies the air to the test chamber unit 30 or the reference chamber unit 70 when the switch 40 is open.

The test chamber unit 30 contains a mobile terminal 1, the water resistance of which is to be tested, in a container 31 thereof, and the air that fills the pressure regulator chamber unit 20 flows into the container 31, whereby the water resistance of the mobile terminal is tested (checked).

The test chamber unit 30 includes a pipe 33 for connecting the container 31 thereof to the outside and an opening and closing member 35 for opening or closing the pipe 33 in order to make the pressure in the container 31 of the test chamber unit 30 reach atmospheric pressure. When the pressure in the container 31 reaches atmospheric pressure, the pipe 33 is closed before the air stored in the pressure regulator chamber unit 20 flows into the container 31 of the test chamber unit 30 for the water resistance test.

Meanwhile, the reference chamber unit 70 is provided to check for changes in the pressure in the internal space 71 thereof under the same conditions and in the same manner as in the test chamber unit 30 before the water resistance of the mobile terminal is tested in the test chamber unit 30. Accordingly, external environmental factors affecting a change in pressure, such as temperature, humidity and the like, are checked in advance, and the checked external environmental factors are incorporated when the water resistance of a mobile terminal is tested in the test chamber unit 30.

The present invention tests the water resistance of a mobile terminal after the pressure in the test chamber unit 30 becomes atmospheric pressure. Here, even under the condition of atmospheric pressure, the pressure, temperature and humidity of the air may vary slightly depending on the time and place. Also, the internal space of a mobile terminal is small, and because the internal space of the mobile terminal is partitioned into smaller spaces in order to improve water resistance, the partitioned space connected to the outside through a leak becomes smaller.

That is, under the condition of atmospheric pressure, even if the change in pressure, temperature or humidity attributable to time and place is small, because the volume of the internal space connected to the outside through a leak in a mobile terminal is very small, the effect of the small change in the internal space cannot be ignored, and the small change may cause an error when the water resistance is checked.

In other words, the effect of the pressure, temperature or humidity of ambient air, which varies depending on the time and place, may be checked through the reference chamber unit 70 in advance, and the effect is incorporated in the water resistance test in the test chamber unit 30, whereby a more precise test may be performed.

In the reference chamber unit 70, a change in pressure in the reference space 71 is tested in the same manner as in the water resistance test in the test chamber unit 30.

That is, after the pressure in the reference space 71 in the reference chamber unit 70 reaches atmospheric pressure, the reference space is sealed so as to prevent the ambient air from flowing in the reference space. Then, the air that fills the pressure regulator chamber unit 20 is forced to flow in the reference space 71, and when sufficient time has passed for the pressure in the pressure regulator chamber unit 20 to become equal to the pressure in the reference space 71, the corresponding pressure is measured.

The difference between the test chamber unit 30 and the reference chamber unit 70 is that the test chamber unit 30 contains a mobile terminal therein but the reference chamber unit 70 does not contain a mobile terminal. That is, because a mobile terminal is not contained in the reference chamber unit 70, before the pressure in the reference chamber unit 70 is forced to reach atmospheric pressure, the process of sucking air therefrom using the suction unit 80 is not required.

The pressure measured in the reference chamber unit 70 includes the effects of all external environmental factors, such as pressure, temperature, humidity and the like of air at atmospheric pressure. Therefore, when a reference pressure to be used to determine whether or not the water resistance of a mobile terminal is normal is calculated based on the pressure measured in the test chamber unit, which is measured in the same manner as the reference chamber unit, even if the external environmental factors are not individually known, all of the external environmental factors may be applied as a single constant value to the calculation.

Additionally, if a test for checking for changes in pressure in the reference chamber unit 70 is performed under the same conditions as the water resistance test in the test chamber unit 30, that is, if the volume of the reference space 71 in the reference chamber unit 70 is identical to the volume acquired by subtracting the volume of the mobile terminal 1 from the volume of the container 31 in the test chamber unit 30, and if the same amount of air is supplied from the pressure regulator chamber unit to the test chamber unit 30 and to the reference chamber unit 70, when the pressure measured in the test for checking for the changes in pressure in the reference chamber unit 70 is identical to the pressure measured in the water resistance test in the test chamber unit within a permissible error range, it may be determined that the water resistance of the mobile terminal is satisfactory. However, if the difference between the two measured pressures falls outside of the error range, it is determined that the water resistance of the mobile terminal is insufficient. Therefore, the water resistance test for a mobile terminal may be simply and quickly performed.

Here, the test for checking for changes in pressure in the reference space 71 depending on external environmental factors may be performed whenever a mobile terminal, the water resistance of which is to be tested, is changed, or may be performed at regular intervals (for example, hourly).

In order to check for changes in pressure in the reference space 71 in the same manner as in the test chamber unit 30, the reference chamber unit 70 includes a pipe 73 connected to the outside and an opening and closing member 75 for opening and closing the pipe 73.

The switch 40 opens or closes the flow path through which air flows between the pressure regulator chamber unit 20 and the test chamber unit 30. Specifically, when the flow path is closed by the switch, the internal space in the pressure regulator chamber unit 20 is filled with air and is maintained at a constant pressure. Conversely, when the flow path is opened by the switch, the air filling the pressure regulator chamber unit 20 flows in the container 31 in the test chamber unit 30.

The pressure-measuring instrument 50 measures the pressure in the container 31 in the test chamber unit 30 or the pressure in the internal space in the pressure regulator chamber unit 20 and transmits the measured pressure to the controller 60, whereby the controller 60 may determine whether or not the mobile terminal 1 is water-resistant.

Also, the pressure-measuring instrument 50 measures the pressure in the reference space 71 in the reference chamber unit 70 and transmits the measured pressure to the controller 60, whereby the controller 60 may detect the effects of external environmental factors, such as temperature, humidity and the like, which vary depending on time and place, in advance and incorporate the effects of external environmental factors in the mobile terminal water resistance test.

The suction unit 80 sucks air from the container 31 of the test chamber unit 30, in which a mobile terminal is contained, thereby removing air from inside the mobile terminal 1.

In other words, when a mobile terminal has deficient water resistance, the air inside the mobile terminal is removed along with the air in the container 31, whereby, when the high-pressure air flows from the pressure regulator chamber unit 20 to the test chamber unit 30, more air may permeate the mobile terminal 1. As a result, the change of pressure in the test chamber unit 30 may be increased, and the accuracy of the water resistance test may be improved.

After the mobile terminal 1 is contained in the test chamber unit 30 and the air in the container 31 and the air inside the mobile terminal (only in the case where the water resistance of the mobile terminal is defective) are removed together, the pipe 33 is opened for a certain time, so that the pressure in the container 31 reaches atmospheric pressure, and is then closed. Here, because the leak in the mobile terminal is likely very small, the amount of air permeating the mobile terminal while the pressure in the container 31 reaches atmospheric pressure is much less than the amount of air that is eliminated through the leak in the mobile terminal.

The controller 60 controls the operation of the regulator 13 of the air-supply means 10, the switch 40, the opening and closing member 35, the suction unit 80 and the like, and determines whether the mobile terminal 1 is water-resistant using the pressure value transmitted from the pressure-measuring instrument 50.

Because the controller 60 already knows the volume of the internal space in the pressure regulator chamber unit 20, the volume of the container 31 in the test chamber unit 30, the volume of the mobile terminal 1, the pressure of the air filling the internal space in the pressure regulator chamber unit 20, the pressure in the container 31 of the test chamber unit 30, and the effects of external environmental factors on the pressure, which have been acquired through the test for checking for changes in pressure in the reference chamber unit 70, the controller may also know the pressure value to be measured (hereinafter, referred to as 'water resistance determination pressure value') when the inflow of the air into the container 31 is completed (that is, the pressure value to be measured when the pressure in the internal space of the pressure regulator chamber unit 20 is equal to the pressure in the container 31 of the test chamber unit 30) under the condition in which the mobile terminal 1 has no problem associated with water resistance.

Accordingly, when the pressure-measuring instrument 50 measures and transmits the pressure in the internal space in the pressure regulator chamber unit 20, because the consecutively transmitted pressure value slowly decreases over time, if the transmitted pressure value is less than the water resistance determination pressure value, the controller 60 determines that the water resistance is defective (in this case, the determination may be made even before the inflow of air to the container 31 is completed). However, if the transmitted pressure value reaches the water resistance determination pressure value and is maintained for a certain time, the controller 60 determines that the water resistance is normal.

Also, when the pressure-measuring instrument 50 measures and transmits the pressure in the container 31 of the test chamber unit 30, the consecutively transmitted pressure value is expected to slowly increase from a low pressure (atmospheric pressure). However, if the transmitted pressure value is maintained for a certain time or decreases, whether or not the mobile terminal 1 is water-resistant is determined. Here, if the maintained pressure value is the same as the water resistance determination pressure value, the mobile terminal 1 is determined to have normal water resistance. However, if the maintained pressure value is less than the water resistance determination pressure value, because a decrease in the transmitted pressure value means that air permeates the mobile terminal, it is determined that the water resistance is defective.

The controller 60 informs a worker of the result of the determination on whether or not the mobile terminal 1 is water-resistant using a monitor, a lamp or a speaker, whereby defective mobile terminals 1 may be sorted from mobile terminals having normal water resistance.

Meanwhile, the controller 60 uses control signals in order to control the electrical and electronic components of the present invention, such as the air-supply means, the suction unit, the switch and the like. However, these control signals may contain noise due to various external factors such as the effect of high frequencies, interference from the electric field of a power supply unit, the effect of the external environment (temperature, humidity, dust and the like), and the like.

Here, the noise in a control signal rapidly increase or decreases the voltage level of the control signal, thus causing unstable operation of each of the components. Furthermore, the noise may cause malfunction and faults of the components.

In order to solve these problems, the present invention provides the controller 60 with a signal-generation module 100 for generating a clean control signal by eliminating the possibility of the inflow of noise to the control signal. Accordingly, the noise that flows in the control signal may be detected and removed in advance, whereby stable operation control may be performed.

The signal-generation module 100 of the present invention may detect and remove the noise through multiple steps, and may again check whether or not a control signal includes noise before finally outputting the control signal.

Hereinafter, the signal-generation module 100 according to an embodiment of the present invention will be described in detail with reference to FIG. 3.

For the convenience of description, elements may be referred to by identical names. Therefore, each element may be inferred from a circuit that includes the corresponding element, or may be identified through reference numerals.

Figure 3:
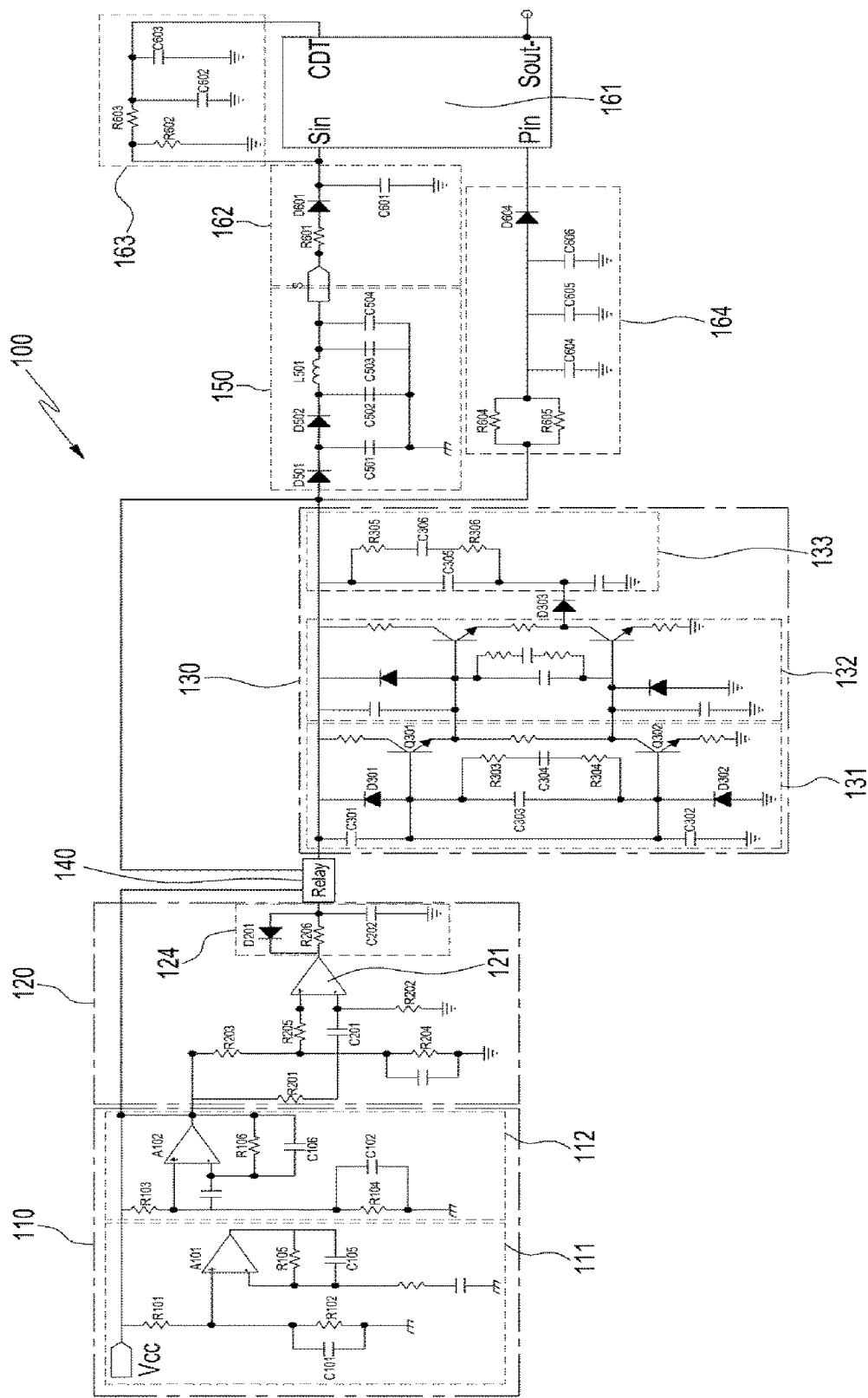
FIG. 3 is a circuit diagram of a signal-generation module for enabling a controller to perform precise control.

As illustrated in FIG. 3, the signal-generation module 100 includes a noise amplifier unit 110 for amplifying DC signal power, a noise detector unit 120 for detecting noise included in the amplified signal power, a filter unit 130 for removing the detected noise, a filter operation unit 140 for operating the filter unit only when noise is detected, a signal generator unit 150 for generating a control signal from the signal power from which noise is removed, and a signal output unit 160 for stabilizing and outputting the generated control signal.

Specifically, in the signal-generation module 100, noise included in the DC signal power is easily detected by the noise detector unit 120 because the noise is also amplified when the noise amplifier unit 110 amplifies the DC signal power, and the filter unit 130 removes the detected noise. Here, because the filter operation unit 140 performs the process of removing noise only when the noise is detected, unnecessary power consumption and operational overload may be prevented. Also, the signal generator unit 150 generates a clean control signal from the signal power from which the noise is removed, and the signal output unit 160 again checks whether the signal contains any noise and then outputs the signal.

Hereinafter, the components of the signal-generation module 100, the operation thereof, and the effect thereof will be described in detail with reference to the accompanying drawing.

The noise amplifier unit 110 includes a first amplifier circuit 111 for first amplifying signal power and a second amplifier circuit 112 for again amplifying the amplified signal power.

The first amplifier circuit 111 and the second amplifier circuit 112 have the same structure, and each of the circuits includes an amplifier A101 or A102, distribution resistors R101 and R102 or R103 and R104 and a capacitor C101 or C102, the distribution resistors and the capacitor being connected to the positive (+) terminal of the amplifier A101 or A102, and a feedback resistor R105 or R106 and a capacitor C105 or C106, which are connected in parallel with each other and are then connected between the output terminal and the negative (−) terminal of the amplifier A101 or A102.

The operation and effect of the first amplifier circuit 111 and the second amplifier circuit 112 will be described with reference to the first amplifier circuit 111 as an example. The amplifier A101 amplifies the voltage level of the signal power by functioning as a non-inverting amplifier using the distribution resistors R101 and R102, the feedback resistor R106, and grounding resistance. Here, because the noise included in the signal power is also amplified, the noise may be easily detected. Here, the feedback capacitor 105 serves to prevent oscillation of the amplifier A101.

The second amplifier circuit 112 also amplifies the signal power through the same process.

Also, the noise amplifier unit 110 is configured such that the output of the amplifier of the first amplifier circuit 111 is connected to the positive (+) terminal of the amplifier of the second amplifier circuit 112. Accordingly, the signal power is first amplified in the first amplifier circuit 111, and the output therefrom is transmitted to the second amplifier circuit 112 and is amplified again therein, whereby the signal power is noticeably amplified and the noise may be easily detected.

Next, the noise detector unit 120 includes a comparator 121, an application circuit 122 connected to the negative (−) terminal of the comparator 121, and a reference circuit 123 connected to the positive (+) terminal of the comparator 121.

More specifically, the application circuit 122 (R201, C201 and R202) includes a resistor R201 and a capacitor C201, which serve to remove a DC component and are connected in series with each other, and a resistor R202 for detecting noise.

Also, the reference circuit 123 (R203, R204 and R205) includes biasing resistors R203, R204 and R205 arranged in parallel with each other in order to provide a reference voltage for determining noise.

The operation and effect of the noise detector unit 120, configured as described above, are as follows. The application circuit 122 removes a DC component from the signal power, which is amplified by the noise amplifier unit 110, and leaves only a noise component using the resistor R201 and the capacitor C201. Then, the noise component is applied to the resistor R202.

Next, the reference circuit generates a reference voltage using the biasing resistors R203, R204 and R205, detects whether noise occurs by causing the comparator 121 to compare the reference voltage with the noise voltage applied to the resistor R202, and operates the filter unit 130 by transmitting an operation signal to the filter operation unit 140 when noise is detected, whereby the noise included in the signal power may be removed. Conversely, when no noise is detected, a non-operation signal is transmitted to the filter operation unit 140, or no signal is transmitted thereto, whereby the filter unit 130 is not operated and the signal power is directly delivered to the signal generator unit. (Here, whether a non-operation signal is transmitted or no signal is transmitted may differ depending on the specification of the filter unit 140.)

(Because the specific circuit configuration of the filter operation unit 140 is already known technology, even if the detailed description thereof is omitted, there is no problem when it is implemented by those skilled in the art.)

Additionally, it is desirable for the noise detector unit 120 to further include a delay circuit 124 for delaying a signal to be transmitted to a relay, as shown in the drawing.

The delay circuit 124 includes a backward diode D201 and a resistor R206, which are arranged in parallel with each other, and a capacitor C202 connected in parallel thereto.

Thanks to the provision of the delay circuit 124, the life of the filter operation unit 140 may be extended. Generally, because noise occurs intermittently rather than continuously, the filter operation unit 140 repeatedly interrupts and resumes its operation, thus reducing its lifespan. Therefore, the delay circuit 124 is provided in order to continuously operate the filter operation unit 140 for a certain time after the operation of the filter operation unit 140 is resumed, whereby the life thereof may be extended.

Next, the filter unit 130 includes first to third filtering circuits 131, 132 and 133, the output terminals and the input terminals of which are sequentially connected.

The first filtering circuit 131 includes a first transistor Q301 and a second transistor Q302, which are npn-type transistors connected in such a way that the emitter of the first transistor Q301 is connected to the collector of the second transistor Q302. Also, a switching diode D301 or D302 and a capacitor C301 or C302, which are arranged in parallel with each other, are connected to the base of each of the first and second transistors Q301 and Q302. Also, two capacitors C303 and C304, arranged in parallel with each other, and two resistors R303 and R304, connected in series with the capacitor C304, are connected between the base of the first transistor Q301 and the base of the second transistor Q302.

Also, the second filtering circuit 132 has the same structure as the first filtering circuit 131.

Also, the third filtering circuit 133 includes two capacitors C305 and C306, arranged in parallel with each other, and two resistors R305 and R306, connected in series with the capacitor C306, and a back current prevention diode D303 may be arranged between the second filtering circuit 132 and the third filtering circuit 133.

Because noise is removed through three steps using the filter unit 130 configured as described above, noise may be removed more effectively than when using a conventional noise filter. Also, after the noise is removed, because signal power having a consistent waveform that is similar to a DC waveform may be output, it is advantageous in that no additional process for rectification or conversion into DC is required.

Next, the signal generator unit 150 includes multiple diodes D501 and D502 for providing a voltage drop in order to generate a control signal, an inductor L501 for filtering, which is connected in series with the multiple diodes, and capacitors C501, C502, C503 and C504 for filtering, which are connected in parallel with the diodes D501 and D502 and the inductor L501.

Although the two diodes D501 and D502 for voltage drop are illustrated in the drawing, two or more diodes may be provided depending on the required amplitude of voltage drop.

The operation and characteristics of the signal generator unit 150 are as follows. While the signal power, from which noise is removed, passes through the diodes D501 and D502 for voltage drop, the voltage level thereof is converted into a voltage level suitable for a control signal, and the noise that flows or is generated in the signal power during the conversion process is removed by the filtering inductor L501 and the filtering capacitors C501, C502, C503 and C504, whereby a clean control signal is generated and is then transmitted to the signal output unit 160.

Next, the signal output unit 160 (161, 162, 163 and 164) includes an output control element 161 for controlling the output of a control signal, a stabilizer circuit 162, connected to the output control element 161, for removing noise from the control signal, a detector circuit 163, connected to the output control element 161, for detecting the state of the control signal and providing feedback to the output control element 161, and a power supply circuit 164 for supplying power to the output control element 161.

The operation and characteristics of each of the circuits are as follows. First, the stabilizer circuit 162 includes a resistor R601 and a diode D601, connected in series with each other, and a capacitor C601 connected in parallel therewith.

The stabilizer circuit 162 stores the delivered control signal in the capacitor C601 through the resistor R601 and the diode D601. Accordingly, a buffer for the input signal may be provided so as to prevent the loss of the signal, and overload of the output control element 161 may be prevented.

Next, the detector circuit 163 includes a voltage-converting resistor R602, a resistor R603 and filtering capacitors C602 and C603.

The detector circuit 163 converts a current of a control signal into a voltage through the resistor R602 so as to be applied to the resistor R603. Then, it is filtered through the capacitors C602 and C603 and is then transmitted to the output control element 161. After that, the output control element 161 checks whether the control signal to be output includes noise through the detector circuit 163, and then outputs the control signal or makes the control signal be filtered again.

Next, the power supply circuit 164 includes voltage-converting resistors R604 and R605, charging capacitors C604, C605 and C606, which are connected in parallel with the voltage-converting resistors, and a discharge prevention diode D604, connected in series with the voltage-converting resistors.

It is desirable for the output control element 161 to always operate in order to finally check and output a control signal. Therefore, it is desirable to provide not only a power supply for supplying power to the entire product but also an additional power supply means for preparation for an emergencies. To this end, the power supply circuit 164 is provided, and the power supply circuit 164 serves to separately supply power for operating the output control element 161 by appropriately processing signal power.

Specifically, the power supply circuit 164 stores the signal power, from which noise has been removed, in the capacitors C604, C605 and C606 through the voltage converting resistors R604 and R605, whereby power may be supplied to the output control element 161 even in the event of an emergency. Here, through the diode D604, the power charged in the capacitors C604, C605 and C606 is prevented from being discharged, and the power is supplied to the output control element 161 in the event of the emergency.

In the above description, the description of additional elements that configure each circuit is omitted, and the design thereof may be changed depending on the embodiment implemented by one skilled in the art.

Hereinafter, the process of testing the water resistance of a mobile terminal, performed using an apparatus for testing the water resistance of a mobile terminal using a reference chamber unit according to the present invention, will be schematically described.

First, the process of checking the effects of external environmental factors using a reference chamber unit 70 is described below.

First, a valve 76 for connecting the reference chamber unit 70 and the pressure regulator chamber unit 20 is closed and the opening and closing member 75 of the pipe 73 is opened, whereby the pressure in the reference space 71 becomes equal to atmospheric pressure.

Subsequently, the reference space 71 is sealed by closing the opening and closing member 75 of the pipe 73.

Subsequently, the internal space 21 in the pressure regulator chamber unit 20 is filled with high-pressure air using the air-supply means 10.

Subsequently, the pressure in the internal space 21 in the pressure regulator chamber unit 20 and the pressure in the reference space 71 in the reference chamber unit 70 are measured using the pressure-measuring instrument 50.

Subsequently, the high-pressure air that fills the pressure regulator chamber unit 20 is forced to flow in the reference space 71 in the reference chamber unit 70 by opening the valve 76 that connects the reference chamber unit 70 and the pressure regulator chamber unit 20.

Subsequently, after sufficient time has passed for the pressure in the internal space 21 in the pressure regulator chamber unit 20 to become equal to the pressure in the reference space 71 in the reference chamber unit 70, the corresponding pressure is measured.

Subsequently, the extent of the effect of external environmental factors (i.e. temperature, humidity and the like) on the change in pressure is calculated from the measured pressure. That is, because a value corresponding to the pressure of the air that fills the pressure regulator chamber unit 20 may differ between the case in which the water resistance test is performed in the reference chamber unit 70 and the case in which the water resistance test is performed in the test chamber unit 30, the extent of the effect of all the external environmental factors on the pressure of the air that fills the pressure regulator chamber unit 20 is calculated from the measured pressure and is acquired as a constant value. For reference, because the volume of the reference space 71 in the reference chamber unit 70 may differ from the volume of the container 31 in the test chamber unit 30, the difference in volume is related to the effects of the external environmental factors. However, because the volume does not change, the effects of the external environmental factors thereon may be included in the constant value related to the pressure of the air that fills the pressure regulator chamber unit 20.

After the effects of the external environmental factors are checked using the reference chamber unit 70, the water resistance of the mobile terminal is tested in the test chamber unit 30. The testing process is as follows.

First, in the state in which the switch 40 between the pressure regulator chamber unit 20 and the test chamber unit 30 and the valve 76 between the pressure regulator chamber unit 20 and the reference chamber unit 70 are closed and in which the valve 85 arranged on the side of the suction unit 80 is open, the suction unit 80 is operated, whereby the air inside the container 31 in the test chamber unit 30 is removed by being emitted to the outside. Here, if the mobile terminal 1, contained in the container 31, has a defect associated with the water resistance thereof, the air inside the mobile terminal 1 may also be removed through the leak causing the defect.

Subsequently, the operation of the suction unit 80 is interrupted, the valve 85 is closed, and the opening and closing member 35 of the pipe 33 is opened. Accordingly, ambient air flows in the container 31, and the pressure in the container 31 becomes equal to atmospheric pressure. When sufficient time has passed for the pressure in the container 31 to become equal to atmospheric pressure, the container 31 is sealed by closing the opening and closing member 35. Here, because the diameter of the opening and closing member 35 is large, the pressure in the container 31 may quickly reach atmospheric pressure. However, because air slowly flows in the mobile terminal through the leak therein, the pressure inside the mobile terminal 1 may not reach atmospheric pressure.

Subsequently, the internal space 21 in the pressure regulator chamber unit 20 is filled with high-pressure air through the air-supply means 10.

Subsequently, the pressure in the internal space 21 in the pressure regulator chamber unit 20 and the pressure in the container 31 in the test chamber unit 30 are measured using the measuring instrument 50.

Subsequently, the high-pressure air that fills the internal space 21 in the pressure regulator chamber unit 20 is forced to flow in the container 31 of the test chamber unit 30 by opening the switch 40.

Subsequently, when sufficient time has passed for the pressure in the internal space 21 of the pressure regulator chamber unit 20 to become equal to the pressure in the container 31 in the test chamber unit 30, the switch 40 is closed, and the pressure in the container 31 in the test chamber unit 30 is measured. Here, the pressure is measured continuously or intermittently, rather than being measured only once.

Subsequently, the water resistance is checked using an 'initial pressure', which was measured in the internal space 21 in the pressure regulator chamber unit 20 and in the container 31 in the test chamber unit 30 before the switch 40 was opened, and a 'water resistance determination pressure', measured in the container 31 in the test chamber unit 30 after the switch 40 is closed.

The determination as to defective water resistance of a mobile terminal is divided into the case in which the mobile terminal has a large leak and the case in which the mobile terminal has a small leak.

When a mobile terminal has a large leak, because a significant amount of high-pressure air, flowing from the pressure regulator chamber unit 20 to the test chamber unit 30, permeates the mobile terminal through the large leak, the 'water resistance determination pressure' measured in the test chamber unit 30 early is relatively lower than normal pressure (the pressure measured when the water resistance of a mobile terminal is normal), whereby the determination may be quickly made.

Conversely, when a mobile terminal has a small leak, because only a small amount of high-pressure air, flowing from the pressure regulator chamber unit 20 to the test chamber unit 30, permeates the mobile terminal through the small leak, the 'water resistance determination pressure' measured in the test chamber unit 30 early is equal to the normal pressure (the pressure measured when the water resistance of the mobile terminal is normal) within a permissible error range.

When a mobile terminal has a large leak, 'L.Leak', for determining whether the mobile terminal is water-resistant, is calculated using the following Equation (1):

$$L.\text{Leak} = (P1 - P2)/P1 \tag{1}$$

where P1 denotes the sum of the initial pressure (P1_1) in the internal space 21 in the pressure regulator chamber unit 20 and the initial pressure (P1_2) in the container 31 in the test chamber unit 30 (that is, P1=P1_1+P1_2), and P2 denotes water resistance determination pressure.

When a mobile terminal has a small leak, 'S.Leak', for determining whether the mobile terminal is water-resistant, is calculated using the following Equation (2):

$$S.\text{Leak} = (P2\_\max - P2\_\min)/P2\_\max$$

where P2_max and P2_min respectively denote the maximum and the minimum pressures, among water resistance determination pressures, continuously or intermittently measured in the container 31 in the test chamber unit 30.

In the case of Equation (1), air emitted from the pressure regulator chamber unit 20 to the test chamber unit 30 is regarded as air leaking from the pressure regulator chamber unit 20, and the water resistance of a mobile terminal is checked using the difference between the leakage when the leakage of air from the pressure regulator chamber unit 20 is normal (that is, if the water resistance of a mobile terminal is satisfactory) and the leakage when the leakage is abnormal (that is, the water resistance of a mobile terminal is defective).

Also, Equation (2) is used to determine whether a mobile terminal is water-resistant while air leaks through the small leak of a mobile terminal (when high-pressure air flows to the inside of the terminal).

The values of 'L.Leak' and 'S.Leak', calculated using Equation (1) and Equation (2), are respectively compared with reference values 'L.Leak ref' and 'S.Leak ref', and if the values of 'L.Leak' and 'S.Leak' are less than the reference values, it is determined that water resistance is deficient, but if not, it is determined that water resistance is satisfactory.

For reference, the lower the values of 'L.Leak' and 'S.Leak' calculated using Equation (1) and Equation (2), the larger the leak in the mobile terminal, which causes a water resistance defect.

For reference, the 'water resistance determination pressure' (normal pressure: P_ref) in the container 31 in the test chamber unit 30 when the water resistance of the mobile terminal is satisfactory is calculated using the following Equation (3):

$$P\_\text{ref} = (P1\_1 * V1 + P1\_2 * V2)/(V1 + V2) \tag{3}$$

where V1 denotes the volume of the internal space 21 in the pressure regulator chamber unit 20 and V2 denotes the volume of the container 31 in the test chamber unit 30 (excluding the volume of the mobile terminal).

Accordingly, instead of Equation (1), which is used when a mobile terminal has a large leak, if P_ref, calculated using Equation (3), is greater than P2, (P2<P_ref), it may be determined that the water resistance of a mobile terminal is defective.

For reference, the effect of external environmental factors, acquired using the reference chamber unit 70, is not expressed in Equations (1) to (3) for determining the water resistance of a mobile terminal. This is because the effect of external environmental factors may be expressed as a constant value related to the pressure of high-pressure air that fills the internal space 21 in the pressure regulator chamber unit 20, as described above.

As described above, the apparatus for testing the water resistance of a mobile terminal using a reference chamber unit according to the present invention checks the effects of external environmental factors, such as temperature, humidity and the like, which vary depending on time and place, in advance using a reference chamber unit and incorporates the effects in a water resistance test in a test chamber unit, whereby the probability of erroneous determination may be significantly reduced. Also, because the air inside a mobile terminal having defective water resistance is removed when a suction unit sucks the air from the test chamber unit containing the mobile terminal and high-pressure air is then blown into the test chamber unit, the change in the pressure in the test chamber unit is increased, whereby a more precise water resistance test may be performed. Furthermore, because unstable high-pressure air emitted from an air compressor is stabilized using a buffer tank and is then supplied to a pressure regulator chamber unit, a more precise water resistance test may be performed. Therefore, the apparatus for testing the water resistance of a mobile terminal using a reference chamber unit according to the present invention is very useful in industrial fields.

As described above, although an apparatus for testing the water resistance of a mobile terminal using a reference chamber unit configured to have a specific form and structure has been described with reference to the accompanying drawings, the present invention may be variously changed and modified by those skilled in the art, and such changes and modifications must be understood as being included in the scope of the present invention.

What is claimed is:

1. An apparatus for testing a water resistance of a mobile terminal using a reference chamber unit, comprising:
    an air-supply means;
    a pressure regulator chamber unit that is filled with air, supplied from the air-supply means, at a constant pressure;
    a test chamber unit for testing the water resistance of the mobile terminal, contained therein, by receiving the air, which fills the pressure regulator chamber unit;
    a reference chamber unit for incorporating external environmental factors in a mobile terminal water resistance test by receiving the air that fills the pressure regulator chamber unit and checking, in advance, a change in a pressure in reference space therein using an identical method as the test chamber unit; and
    a controller for controlling operation of the air-supply means and determining whether or not the mobile terminal is water-resistant using a pressure value transmitted from a pressure-measuring instrument arranged in the pressure regulator chamber unit or in the test chamber unit and using a pressure value transmitted from a pressure-measuring instrument in the reference chamber unit,
    wherein the controller comprises a signal-generation module that includes a noise amplifier unit for amplifying DC signal power, a noise detector unit for detecting noise included in the amplified signal power, a filter unit for removing the detected noise, a filter operation unit for operating the filter unit only when the noise is detected, a signal generator unit for generating a control signal from the signal power from which the noise is removed, and a signal output unit for checking whether the generated control signal is clean and outputting the control signal.

2. The apparatus of claim 1,
further comprising a suction unit for sucking air from the test chamber unit that contains the mobile terminal therein,
wherein the test chamber unit includes a pipe for connecting a container therein to an outside in order to make a pressure in the container reach atmospheric pressure and an opening and closing member for opening or closing the pipe.

3. The apparatus of claim 1, wherein the air-supply means comprises:
a compressor for supplying high-pressure air;
a buffer tank in which the high-pressure air, injected from the compressor, is stored for a certain time and thereby is stabilized; and
a regulator for supplying the air stored in the buffer tank to the pressure regulator chamber unit at a constant pressure.

4. The apparatus of claim 1, wherein:
the noise amplifier unit includes a first amplifier circuit for first amplifying the signal power and a second amplifier circuit for again amplifying the amplified signal power;
wherein each of the first amplifier circuit and the second amplifier circuit includes an amplifier (A101) or (A102); distribution resistors (R101) (R102) or (R103) (R104) and a capacitor (C101) or (C102), which are connected to a positive (+) terminal of the amplifier (A101) or (A102); and a feedback resistor (R105) or (R106) and a capacitor (C105) or (C106), which are connected in parallel with each other and are then connected between an output terminal and a negative (−) terminal of the amplifier (A101) or (A102), an output terminal of the amplifier of the first amplifier circuit being connected to a positive (+) terminal of the amplifier of the second amplifier circuit,
the noise detector unit includes a comparator, an application circuit connected to a negative (−) terminal of the comparator, and a reference circuit connected to a positive (+) terminal of the comparator,
wherein the application circuit includes a resistor (R01) and a capacitor (C201), which serve to remove a DC component and are connected in series with each other, and a resistor (R202) for detecting noise, and the reference circuit includes biasing resistors (R203) (R204) (R205), arranged in parallel with each other, for providing a reference voltage for detecting noise;
the filter unit includes first to third filtering circuits, output terminals and input terminals of which are sequentially connected,
wherein:
the first filtering circuit includes first and second transistors (Q301) (Q302), which are npn-type transistors connected in such a way that an emitter of the first transistor is connected to a collector of the second transistor; a switching diode (D301) or (D302) and a capacitor (C301) or (C302), arranged in parallel with each other, are connected to a base of each of the first and second transistors (Q301) (Q302); and two capacitors (C303) (C304), arranged in parallel with each other, and two resistors (R303) (R304), connected in series with the capacitor (C304), are connected between the base of the first transistor (Q301) and the base of the second transistor (Q302),
the second filtering circuit has an identical structure to the first filter circuit, and
the third filtering circuit includes two capacitors (C305) (C306), arranged in parallel with each other, and two resistors (R305) (R306), connected in series with the capacitor (C306), and a back current prevention diode (D303) is arranged between the second filtering circuit and the third filtering circuit, and
the signal generator unit includes multiple diodes (D501) (D502) for providing voltage drop in order to generate a control signal, an inductor (L501) for filtering, connected in series with the multiple diodes, and capacitors (C501) (C502) (C503) (C504) for filtering, connected in parallel with the diodes (D501) (D502) and the inductor (L501).

* * * * *